US011113349B2

United States Patent
Seetharaman et al.

(10) Patent No.: US 11,113,349 B2
(45) Date of Patent: Sep. 7, 2021

(54) COHORT SERVICE

(71) Applicant: Microsoft Technology Licensing, LLC, Redmond, WA (US)

(72) Inventors: Usha Seetharaman, Bangalore (IN); Saurabh Agarwal, Bangalore (IN); Saravanan Arumugam, TamilNadu (IN); Aastha Jain, Sunnyvale, CA (US); Parag Agrawal, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 319 days.

(21) Appl. No.: 16/279,779

(22) Filed: Feb. 19, 2019

(65) Prior Publication Data

US 2020/0265101 A1 Aug. 20, 2020

(51) Int. Cl.
| | |
|---|---|
| *G06F 16/20* | (2019.01) |
| *G06F 16/9535* | (2019.01) |
| *G06F 16/2457* | (2019.01) |
| *G06N 20/00* | (2019.01) |
| *H04L 29/08* | (2006.01) |
| *G06F 9/451* | (2018.01) |

(52) U.S. Cl.
CPC ......... *G06F 16/9535* (2019.01); *G06F 9/451* (2018.02); *G06F 16/24575* (2019.01); *G06F 16/24578* (2019.01); *G06N 20/00* (2019.01); *H04L 67/306* (2013.01)

(58) Field of Classification Search
CPC . G06F 16/95; G06F 16/9035; G06F 16/24578
See application file for complete search history.

(56) References Cited

U.S. PATENT DOCUMENTS

| | | | | |
|---|---|---|---|---|
| 8,856,235 | B2 * | 10/2014 | Zhou ................ | G06Q 10/06398 709/204 |
| 9,519,684 | B2 * | 12/2016 | Xu ..................... | G06F 16/24578 |
| 10,296,841 | B1 * | 5/2019 | Moriarty ................. | H04L 67/18 |
| 2006/0259344 | A1 * | 11/2006 | Patel ....................... | G06Q 30/02 705/7.33 |
| 2013/0103758 | A1 * | 4/2013 | Alison ................... | G06Q 50/01 709/204 |

* cited by examiner

*Primary Examiner* — Belix M Ortiz Ditren
(74) *Attorney, Agent, or Firm* — Schwegman Lundberg & Woessner, P.A.

(57) ABSTRACT

A cohort service is configured to address the technical problem of providing recommendations to a member of an online connection network system in a manner that alleviates potentially excessive cognitive load associated with presenting recommended entities indiscriminately as a scrollable list. The cohort service is configured to visually surface recommended relevant entities already grouped as cohorts. A cohort is a grouping of entities based on one or more common attributes, such as, e.g., same school, same company, etc. The cohort service is designed to group recommendation results into cohorts at the server side, which increases the liquidity and the relevance of the recommended entities so that the already grouped recommendations can be sent to the client computer system for presentation to a viewer.

18 Claims, 4 Drawing Sheets

COHORT SERVICE

TECHNICAL FIELD

This application relates to the technical fields of software and/or hardware technology and, in one example embodiment, to system and method to recommend cohorts of entities to a member in an online connection network system.

BACKGROUND

An online connection network system is a platform for connecting people in virtual space. An online connection network system may be a web-based platform, such as, e.g., a connection networking web site, and may be accessed by a user via a web browser or via a mobile application provided on a mobile phone, a tablet, etc. An online connection network system may be a business-focused connection network that is designed specifically for the business community, where registered members establish and document networks of people they know and trust professionally. Each registered member may be represented by a member profile. A member profile may be represented by one or more web pages, or a structured representation of the member's information in XML (Extensible Markup Language), JSON (JavaSciipt Object Notation) or similar format. A member's profile web page of a connection networking web site may emphasize employment history and professional skills of the associated member. An online connection network system is also designed to allow registered members to establish and document networks of people they know and trust professionally, as well as to follow information published with respect to companies, schools, industry trends, etc.

BRIEF DESCRIPTION OF DRAWINGS

Embodiments of the present invention are illustrated by way of example and not limitation in the figures of the accompanying drawings, in which like reference numbers indicate similar elements and in which.

DETAILED DESCRIPTION

Figure 1:
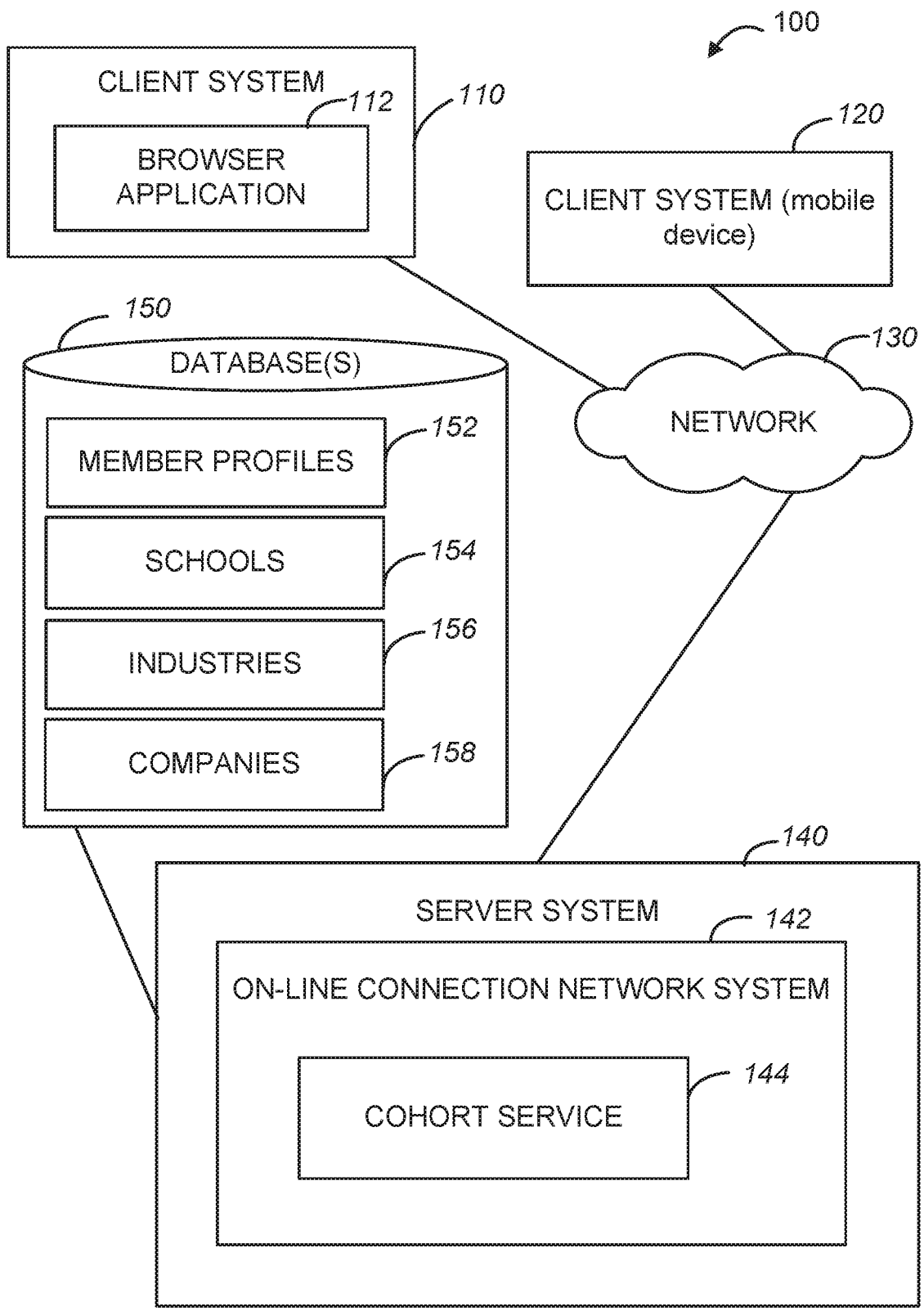
FIG. 1 is a diagrammatic representation of a network environment within which an example method and system to recommend cohorts of entities to a member in an online connection network system may be implemented.

A method and system to recommend cohorts of entities to a member in an online connection network system are described, In the following description, for purposes of explanation, numerous specific details are set forth in order to provide a thorough understanding of an embodiment of the present invention. It will be evident, however, to one skilled in the art that the present invention may be practiced without these specific details.

As used herein, the term "or" may be construed in either an inclusive or exclusive sense. Similarly, the term "exemplary" is merely to mean an example of something or an exemplar and not necessarily a preferred or ideal means of accomplishing a goal. Additionally, although various exemplary embodiments discussed below may utilize Java-based servers and related environments, the embodiments are given merely for clarity in disclosure. Thus, any type of server environment, including various system architectures, may employ various embodiments of the application-centric resources system and method described herein and is considered as being within a scope of the present invention.

For the purposes of this description the phrases "an online connection networking application" and "an online connection network system" may be referred to as and used interchangeably with the phrase "an online connection network" or merely "a connection network." It will also be noted that an online connection network may be any type of an online connection network, such as, e.g., a professional network, an interest-based network, or any online networking system that permits users to join as registered members. A member is represented in an online connection network system by a member profile that may include various information such as, e.g., the name of a member, current and previous geographic location of a member, current and previous employment information of a member, information related to education of a member, information about professional accomplishments of a member, publications, patents, as well as information about the member's professional skills. Each member of an online connection network is represented by a member profile (also referred to as a profile of a member or simply a profile). As mentioned above, an online connection network system may be designed to allow registered members to establish and document networks of people they know and trust professionally. Any two members may indicate their mutual willingness to be "connected" in the context of the online connection network system, in that they can view each other's profiles, profile recommendations and endorsements for each other and otherwise be in touch via the online connection network system. Members who are connected in the context of an online connection network system may be termed each other's "connections" and their respective profiles are associated with respective connection links indicative of these two profiles being connected.

In addition to member profiles, an online connection network system also maintains other types of entities, such company pages, industry pages, etc. Thus, a member profile is an entity of "member profile" entity type, a company page is an entity of a company entity type, etc. Each entity type (e.g., member profile, company page, industry page) has its particular way of organizing and storing data by associating different types of data with different fields in the associated entities. For example, a profile of a company in the online connection network system may be associated with a company web page and include information about the company. A company web page in the online social network system may include a visual control, e.g., a "Follow" button that a user may activate to indicate that they would like to "follow" the company page. A member profile representing a member that "follows" a company page may include a link indicating this relationship between the member profile and the company page. This relationship may be expressed in the context of the online social network system in that the news and notifications, e.g., regarding job openings at the company, changes in the organization of the company, new members on the executive team, etc., may be communicated to the member associated with the member profile, e.g., via the member's news feed web page, etc.

In order to help members build active communities, the online connection network system provides a recommendation service that provides recommendation with respect to entities a member may wish to connect with or to follow. An example of a recommendation service is a service that may be termed "People You May Know" abbreviated as PYMK, as it makes the determination of a likelihood that a member may wish to connect with another member in the online connection network system based on factors that indicate overlapping professional or educational background. While it is desirable to provide members with a more user friendly and more engaging way to explore entities in the online connection network system, existing solutions do not scale well across multiple recommended entities, as there is too much cognitive load to bear while scrolling through.

The technical problem of providing recommendations to a member in a manner that alleviates potentially excessive cognitive load associated with presenting recommended entities indiscriminately as a scrollable list is addressed by visually surfacing entities as cohorts. The methodologies described herein, implemented as a cohort service provided with or as part of the online connection network system, improve the existing entity recommendation process in the online connection network by providing more relevant recommendations and more engaging discovery experience for members. A cohort is a grouping of entities based on one or more common attributes. For example, recommended member profiles that indicate that the associated members attended the same school as the viewer may be grouped into a school cohort, and recommended member profiles that indicate that the associated members worked at the same organization as the viewer's current or previous company may be grouped into a company cohort. Cohorts can be composed of entities of the same type (e.g., all recommended entities in a cohort being member profiles) or of mixed entity types (e.g., an industry cohort may include member profiles and company pages). The member profile representing the viewer, for whom recommendations are being generated, may be termed the source member profile.

In some existing systems, the PYMK service, which runs at the server system, discovers and ranks entities that are potential recommendations based on their respective relevance scores as related to the likelihood of the viewer (a member to whom the recommendations are to be displayed). The top-ranked recommendations are then delivered to the client system associated with the viewer. The PYMK endpoint (the client system associated with the viewer) allows for faceted queries, where the client can specify filters to constrain the PYMK results. In this scenario, however, the cohorts can be formed at the client after the recommended entities produced by PYMK are delivered to the client. While the client has the knowledge of the current context in which the PYMK query is made (e.g., the member just accepted an invitation) and can be configured to have cohort forming functionality, the client may have no means to determine the optimal PYMK grouping of entities for display to the member.

The technical problem of reducing the need for developing specialized code at the client side as well as reducing code duplication (e.g., eliminating the need for writing a separate filter for each school entity in order to group recommended member profiles representing members who attended the same school) is addressed by configuring the cohort service to group recommendation results into one or more cohorts at the server side, so that the already grouped recommendations can be sent to the client.

In operation, the cohort service detects an event received from the client associated with a member profile, the event triggering the recommendations flow. From the client, the cohort service receives a viewing context and, based on the viewing context, determines how to group the candidate entities. For example, if the viewing context indicates that the member associated with the client system invited a colleague to connect in the online connection system, the cohort service groups recommendations from the retrieved candidate entities into a company cohort. Or, the viewing context may indicate that the member joined an alumni group in the online connection network system. The cohort service then groups the retrieved candidate entities into a school cohort and may supplement the grouped recommendations with a note, such as, "People that went to your university."

In some embodiments, the presentation user interface (UI) generated by the cohort service permits a viewer (a member to whom the recommendations grouped as cohorts are being presented) to select multiple entities from the cohort and request an action with respect to all of the selected entities. For example, the presentation UI may include a presentation of a school cohort that includes references to member profiles of people who went to the same school as the viewer, with a caption, "People who also went to Harvard Business School." The presentation UI may permit the viewer to select a subset, or even all of the member profiles from the cohort, and request that a connection invitation is sent to each member represented by the respective selected member profiles. This request is processed in the online connection network system by sending the connection invitation to each member represented by the selected member profiles.

In some embodiments, the ranking of the candidate entities in the cohort service is done using a hierarchical machine learning model that combines a global ranking order (ranking of entities within a cohort) with a per-cohort ranking order (ranking of cohorts themselves termed across-cohort ranking, as well as ranking of entities based on their respective ranks in different cohorts in cases when one entity can be included in multiple cohorts). This hierarchical ranking approach, where the within-cohort ranking can influence the result of the across-cohort ranking, is referred to as joint ranking; and the hierarchical machine learning model is referred to as a cohorts hierarchical model for the purposes of this description.

Problem formulation for the cohorts hierarchical model that predicts probability of the member for whom the recommendation is generated initiating a certain action with respect to a candidate entity (e.g., a connection invitation if the candidate entity is a member profile) is provided as follows.

Within cohort regression expressed by Equation (1) below.

$$\text{logit}(Y_{ij}) = \mu_i + \beta_i X_{ij} + \varepsilon_{ij} \qquad \text{Equation (1)}$$

where:

i is the index for a cohort, and j is the index for an observation within a cohort;

X is a feature vector representation of each candidate entity (e.g., respective feature vectors of member profiles where candidate entities are member profiles);

μ and β are learned coefficients;

ε is the within-cohort error term;

Y predicts probability of the member for whom the recommendation is generated initiating a certain action with respect to a candidate entity.

Across cohort regression is expressed by Equation (2) below.

$$\mu_i = \gamma_0 + \gamma_1 U_{i1} + u_i$$

$$\beta_i = \delta_0 + \delta_1 U_{i2} + v_i \quad \text{Equation (2)}$$

where:
i is the index for a cohort;
U is the feature vector representation of each candidate entity (source features);
$\gamma$ and $\delta$, are learned coefficients;
u and v are across-cohort error terms for $\mu_i$ and $\beta_i$ respectively.

Combining Equation (1) and Equation (2) results in Equation (3) below.

$$\text{logit}(Y_{ij}) = u_i + v_i X_{ij} + \delta_0 X_{ij} + \gamma_0 + \gamma_1 U_{i1} + \delta_1 X_{ij} U_{i2} + \varepsilon_{ij} \quad \text{(Equation 3)}$$

Ignoring the cross-classification term $\delta_1 X_{ij} U_{i2}$, Equation (3) can be written in a matrix form, as Equation (4), as shown below.

$$\text{logit}(Y_{N\times 1}) = X_{N\times P} \cdot \beta_{P\times 1} + U_{N\times M \cdot Q} \cdot C_{M \cdot Q \times 1} \times \in_{N\times 1} \quad \text{Equation (4)}$$

where:
X is the standardized (by z-score) feature vector representation of each candidate entity (source+destination+pair features, where P is the total number of features);
U is the feature vector representation of each candidate entity (source features, where S the number of source features);
$\beta$ coefficients are fixed effect coefficients;
C coefficients are learned random effect coefficients that are specific for respective cohorts (that represent cohort properties mathematically) and that can also be used in across-cohort ranking;
Q is the dimensionality of random effects equals the number of source-member-features);
M is the number of cohorts.

Equation (5) below represents a model that predicts the probability of probability of the member for whom the recommendation is generated initiating a certain action with respect to a candidate entity, (i.e., logit($Y_{N\times 1}$)). The prediction Y is associated with a pair comprising the member profiles, representing the viewer and a candidate entity.

Response variable Y is a binary value indicating whether the certain action (e.g., a connection) was effectuated (given the impression having taken place).

$$\text{logit}(Y_{N\times 1}) \approx X_{N\times P} \cdot \beta_{P\times 1} + U_{N\times 4S} \cdot C_{4S\times 1} \quad \text{Equation (5)}$$

where:
X is the standardized (by z-score) feature vector representation of each candidate entity (source+destination+pair features, where is the total number of features);
U is the feature vector representation of each candidate entity (source features, where S the number of source features);
$\beta$ coefficients are fixed effect coefficients;
C coefficients are learned random effect coefficients that are specific for respective cohorts (that represent cohort properties mathematically) and that can also be used in across-cohort ranking;
S is the dimensionality of random effects (that equals the number of source-member-features).

In the equation above, cross-cohort information is also used for ranking. Cross-cohort ranking means that, if, for example, the cohorts that are at issue are the school cohort and the company cohort, the school cohort information is used to rank the company cohort and vice versa.

Ranking of the cohorts in the cohort service is done using a model represented by Equation (6).

$$\text{logit}(Y_{N\times 1}) \approx X_{N\times (S+C)} \cdot B_{(S+C)\times 1} \quad \text{Equation (6)}$$

where:
$y_j = 1$, if the predetermined click-through action took place with respect to the viewer represented by the source member profile and at-least one entity from $j^{th}$ cohort, otherwise 0;
X is the cohort-level feature vector matrix (source-member features and cohort embeddings);
N is the number of impressions/observations for a (source member profile, cohort) pair;
C is the dimensionality of cohort embeddings (C values that were captured by the within-cohort level model);
S is the dimensionality of the source member profile features;
B are fixed effect coefficients.

Response variable for the model represented by Equation (6) is a binary value computed for each (source, cohort) pair as shown in Equation (7).

$$Y(s, c) = \begin{Bmatrix} 1 \text{ if source } s, \text{connects with any of the} \\ \text{destination members from the cohort } c \\ \hline 0 \text{ otherwise} \end{Bmatrix} \quad \text{Equation (7)}$$

Cross-cohort ranking in the cohort service is done using a model represented by Equation (8).

$$\text{logit}(Y_{N\times 1}) \approx X \cdot \beta + \sum_k U_k C_k + \sum_{i,j \in k\times k} [[U_i][U_j]] \left[\frac{C_i}{C_j}\right] + \sum_{h,i,j \in k\times k} [[U_h][U_i][U_j]] \left[\frac{C_k}{\frac{C_i}{C_j}}\right] + \ldots \quad \text{Equation (8)}$$

Where k represents one entity-type. So if we have people, event and group cohorts, k=3
X, $\beta$ represents fixed-effect of the model
$U_k C_k$ represents random-effect for a cohort of a particular entity-type $$[[U_i][U_j]] \left[\frac{C_i}{C_j}\right]$$

represents pairwise random-interaction for a cohort consisting of two entity-types $$[[U_h][U_i][U_j]] \left[\frac{C_k}{\frac{C_i}{C_j}}\right]$$

represents random-interaction for a cohort consisting of three entity-types

The cross-cohort ranking model for ranking cohorts that include entities of a single entity type is represented by Equation (9).

$$logit(Y_{N \times 1}) \approx X \cdot \beta + \sum_{k} U_k C_k \quad \text{Equation (9)}$$

where:

k represents one entity type (e.g., if there are three cohorts—people, event, and group cohorts—then k=3);

X, β represents fixed effect of the model;

$U_k C_k$ represents random effect for a cohort of a particular entity type.

In some embodiments, models developed as part of the cohort service may be constructed to capture member preferences with respect to selecting which other members to connect to (e.g., preference to connect to coworkers more than to alumni) and generate a personalized ranking of the cohorts themselves. A personalized ranking of cohorts for each user may also be developed by training cohort-level embeddings and using these embeddings to generate a personalized score to rank cohorts. An example cohort service may be implemented in the context of a network environment 100 illustrated in FIG. 1.

As shown in FIG. 1, the network environment 100 may include client systems 110 and 120 and a server system 140. The client system 120 may be a mobile device, such as, e.g., a mobile phone or a tablet. The server system 140, in one example embodiment, may host an online connection network system 142. As explained above, each member of an online connection network is represented by a member profile that contains personal and professional information about the member and that may be associated with connection links that indicate the member's connection to other member profiles in the online connection network. Member profiles and related information may be stored in a database 150 as member profiles 152. The database 150 also stores other entities, such as school-type entities, company-type entities, etc.

The client systems 110 and 120 may can access the server system 140 via a communications network 130, utilizing, e.g., a browser application 112 executing on the client system 110, or a mobile application executing on the client system 120. The communications network 130 may be a public network (e.g., the Internet, a mobile communication network, or any other network capable of communicating digital data). As shown in FIG. 1, the server system 140 also hosts a cohort service 144. The cohort service 144 is configured to recommend cohorts of entities to a member in an online connection network, by applying methodologies discussed herein. Example components of the cohort service 144 are illustrated in FIG. 2.

Figure 2:
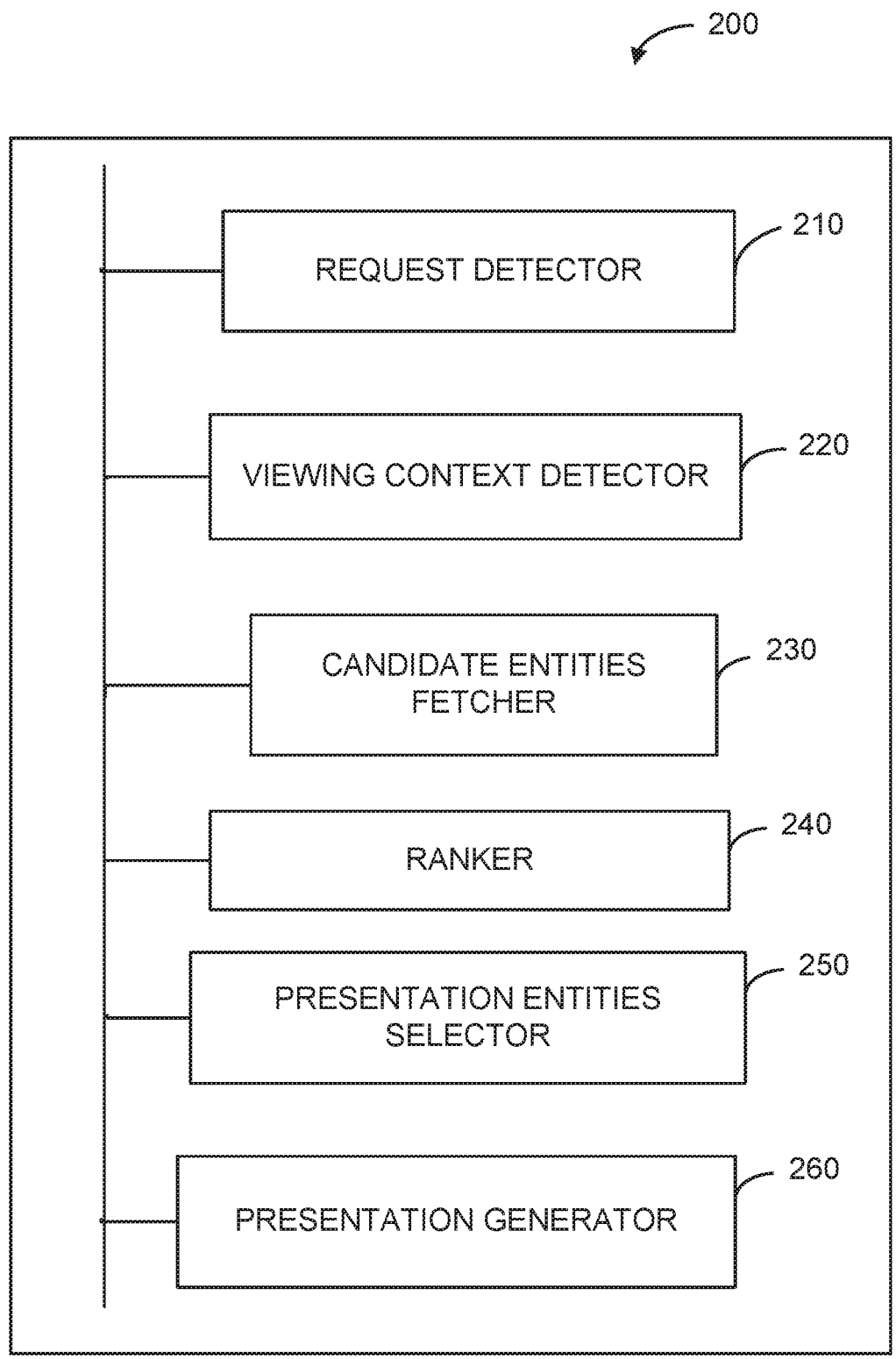
FIG. 2 is a block diagram of a system to recommend cohorts of entities to a member in an online connection network system, in accordance with one example embodiment.

FIG. 2 is a block diagram of a system 200 to recommend cohorts of entities to a member in an online connection network. As shown in FIG. 2, the system 200 includes a request detector 210, a viewing context detector 220, a candidate entities fetcher 230, a ranker 240, a presentation entities selector 250, and a presentation generator 260.

The request detector 210 is configured to detect a request for recommendations with respect to a member represented by a member profile, in the online connection network system 142 of FIG. 1, which is in communication with a client application executing at a client system associated with the member (e.g., at the client system 110 of FIG. 1). The viewing context detector 220 is configured to receive, from the client application, a viewing context in response to the detected request. The viewing context indicating a cohort of entities having a certain cohort attribute value. For example, is a cohort is a company cohort, the certain cohort attribute value may be the identification of a company that is the current place of employment of the member represented by a member profile. The member profile representing a member/viewer for whom the recommendations are being prepared is also referred to as the source member profile or the source profile. The candidate entities fetcher 230 is configured to fetch, at the server system that hosts the cohorts service, to fetch candidate entities for providing to the member as recommendations. The candidate entities are cohort entities having the certain cohort attribute value. The ranker 240 is configured to rank the candidate entities using the machine learning techniques described with respect to Equations (1)-(8) above. The presentation entities selector is configured to select presentation entities from the candidate entities based on the ranking produced by the ranker 240. The presentation generator 260 is configured to cause display of a reference to an entity from the presentation entities on a display device associated with the member. Some operations performed by the system 200 may be described with reference to FIG. 3.

Figure 3:
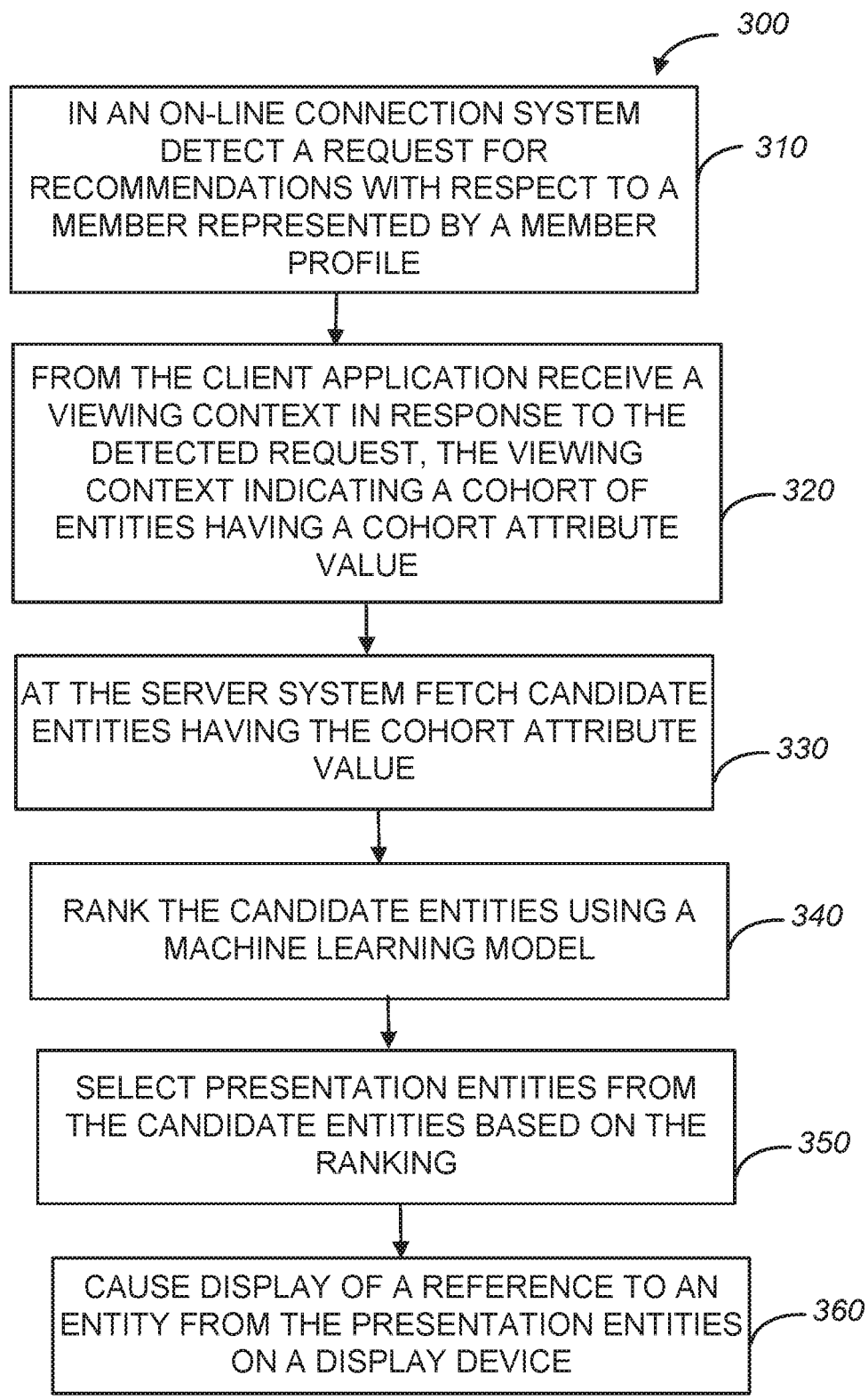
FIG. 3 is a flowchart illustrating a method to recommend cohorts of entities to a member in an online connection network system, in accordance with an example embodiment.

FIG. 3 is a flowchart of a method 300 to recommend cohorts of entities to a member in an online connection network 142 of FIG. 1. The method 300 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 140 of FIG. 1 and, specifically, at the system 200 shown in FIG. 2.

As shown in FIG. 3, the method 300 commences at operation 310, when the request detector 210 detects a request for recommendations with respect to a member represented by a member profile, in the online connection network system 142 of FIG. 1. At operation 320, the viewing context detector receives, from the client application, a viewing context in response to the detected request. The candidate entities fetcher 230 fetches, at the server system that hosts the cohorts service, candidate entities for providing to the member as recommendations, at operation 330. At operation 340, the ranker 240 ranks the candidate entities using the machine learning techniques described with respect to Equations (1)-(8) above. The presentation entities selector selects presentation entities from the candidate entities based on the ranking produced by the ranker 240, at operation 350. The presentation generator 260 causes display of a reference to an entity from the presentation entities on a display device associated with the member at operation 360.

Figure 4:
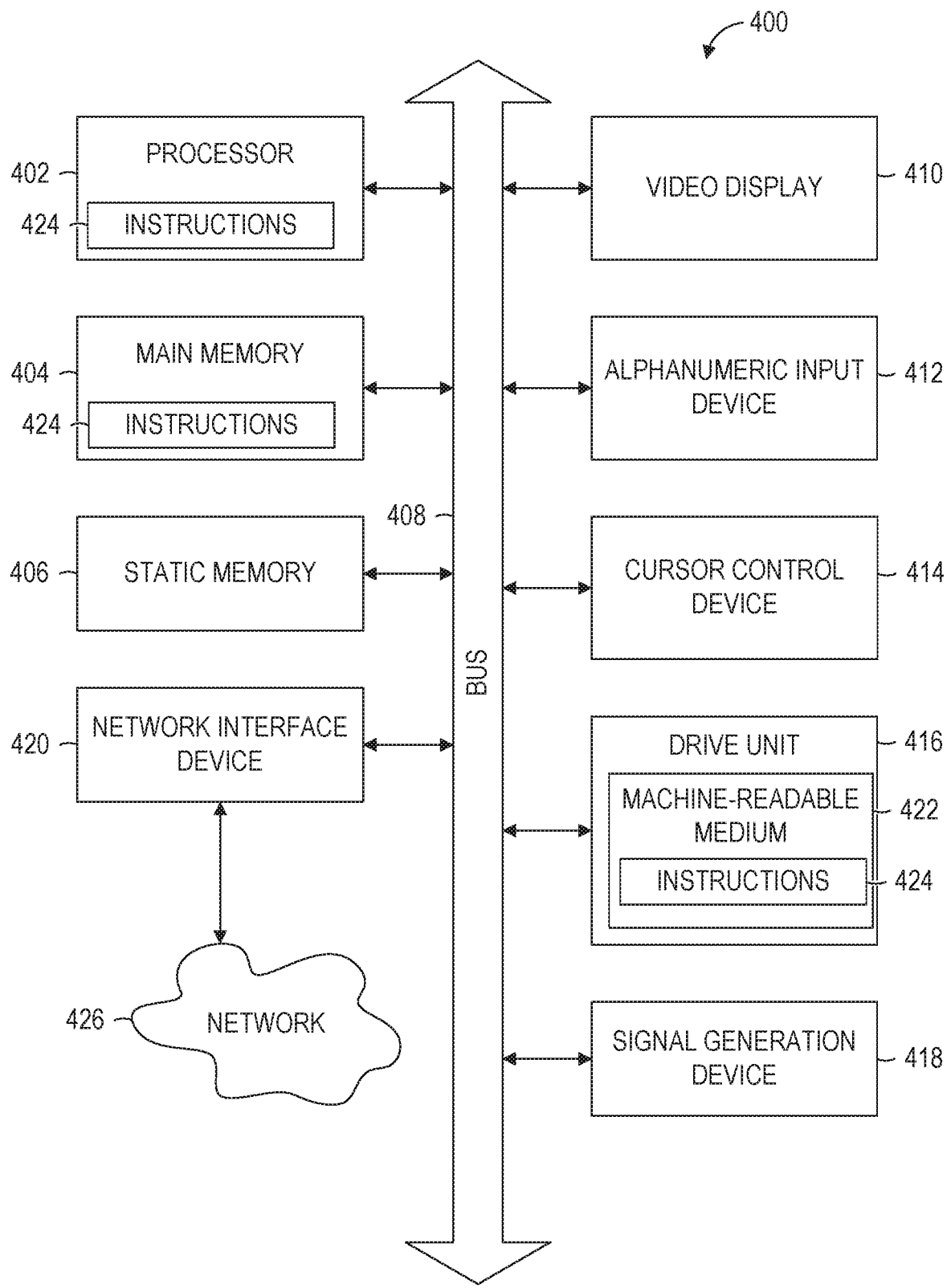
FIG. 4 is a diagrammatic representation of an example machine in the form of a computer system within which a set of instructions, for causing the machine to perform any one or more of the methodologies discussed herein, may be executed.

FIG. 4 is a diagrammatic representation of a machine in the example form of a computer system 400 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU) or both), a main memory 404 and a static memory 406, which communicate with each other via a bus 404. The computer system 400 may further include a video display unit 410 (e.g., a liquid crystal display (LCD) or a cathode ray tube (CRT)). The computer system 400 also includes an alpha-numeric input device 412 (e.g., a keyboard), a user interface (UI) navigation device 414 (e.g., a cursor control device), a disk drive unit 416, a signal generation device 418 (e.g., a speaker) and a network interface device 420.

The disk drive unit 416 includes a machine-readable medium 422 on which is stored one or more sets of instructions and data structures (e.g., software 424) embodying or utilized by any one or more of the methodologies or functions described herein. The software 424 may also reside, completely or at least partially, within the main memory 404 and/or within the processor 402 during execution thereof by the computer system 400, with the main memory 404 and the processor 402 also constituting machine-readable media.

The software 424 may further be transmitted or received over a network 426 via the network interface device 420 utilizing any one of a number of well-known transfer protocols (e.g., Hyper Text Transfer Protocol (HTTP)).

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

MODULES, COMPONENTS AND LOGIC

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) be driven by cost and time considerations.

Accordingly, the term "hardware-implemented module" should be understood to encompass a tangible thing, be that a thing that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Thus, a method and system to recommend cohorts of entities to a member in an online connection network has been described. Although embodiments have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense.

The invention claimed is:

1. A computer implemented method comprising:
   in an online connection system, detecting a request for recommendations with respect to a first member represented by a first member profile, the request received from a client application executing at a client system associated with the first member;
   from the client application, receiving information indicating a viewing context associated with the detected request, the viewing context indicating a first attribute value of a member with whom the first member has recently established a connection via the online connection system;
   at a server system, fetching a first plurality of candidate member profiles for providing to the first member as connection recommendations, each candidate member profile in the first plurality of candidate member profiles having a member profile indicating the first cohort attribute value;
   ranking the first plurality of candidate member profiles using a machine learning model;
   selecting a first cohort of member profiles from the first plurality of candidate member profiles based on the ranking; and
   causing display of a reference one or more references to one or more member profiles in the first cohort of member profiles on a display device associated with the first member.

2. The method of claim 1, wherein the viewing context indicates a a second attribute value of the member with whom the first member recently established a connection via the online connection system.

3. The method of claim 2, further comprising:
   at the server system, fetching a second plurality of candidate member profiles for providing to the first member as connection recommendations, each candidate member profile in the second plurality of candidate member profiles having the second attribute value;
   ranking the second plurality of candidate member profiles using the machine learning model;
   selecting a second set of member profiles from the second plurality of candidate member profiles based on the ranking; and
   causing display of a reference to one or more member profiles in the second cohort of member profiles on a display device associated with the first member.

4. The method of claim 3, wherein the machine learning model is a hierarchical machine learning model and the ranking of the candidate member profiles comprises jointly ranking member profiles within the first plurality of member profiles and the second plurality of member profiles and ranking across the first plurality of member profiles and the second plurality of member profiles.

5. The method of claim 4, comprising using the hierarchical machine learning model to capture properties of the first plurality of member profiles during the ranking of the first and second plurality of member profiles and using the captured properties during the ranking.

6. The method of claim 1, wherein causing display of one or more references to one or more member profiles in the first cohort of member profiles comprises:
   generating a user interface that includes the one or more references to the one or more member profiles, presented as a group.

7. The method of claim 6, wherein the user interface includes selection controls to permit a user to select multiple of the one or more references and request an action with respect to a group of member profiles corresponding with the selected references.

8. The method of claim 7, wherein the action is to initiate a connection invitation from the first member with respect to member profiles corresponding to the respective selected references.

9. The method of claim 1, wherein the first attribute value is a member profile attribute value of the member with whom the first member has recently established a connection via the online connection system, the member profile attribute value indicating identification of a school or identification of a company.

10. A system comprising:
    one or more processors; and
    non-transitory computer readable storage medium comprising instructions that where executed by the one or processors cause the one or more processors to perform operations comprising:
    in an online connection system detecting a request for recommendations with respect to a first member represented by a first member profile, the request received from a client application executing at a client system associated with the first member;
    from the client application, receiving information indicating a viewing context associated with the detected request, the viewing context indicating a first attribute value of a member with whom the first member has recently established a connection via the online connection system;
    at a server system, fetching a first plurality of candidate member profiles for providing to the first member as connection recommendations, each candidate member profile in the first plurality of candidate member profiles having a member profile indicating the first attribute value;

ranking the first plurality of candidate entities member profiles using a machine learning model;

selecting a first cohort of member profiles from the first plurality of candidate member profiles based on the ranking; and causing display of one or more references to one or more member profiles in the first cohort of member profiles on a display device associated with the first member.

11. The system of claim 10, wherein the viewing context indicates a a second attribute value of the member with whom the first member recently established a connection via the online connection system.

12. The system of claim 11, further comprising:

at the server system, fetching a second plurality of candidate member profiles for providing to the first member as connection recommendations, each candidate member profile in the second plurality of candidate member profiles having the second attribute value ranking the second plurality of candidate member profiles using the machine learning model;

selecting a second set of member profiles from the second plurality of candidate member profiles based on the ranking; and causing display of a reference to one or more member profiles in the second cohort of member profiles on a display device associated with the first member.

13. The system of claim 12, wherein the machine learning model is a hierarchical machine learning model and the ranking of the candidate member profiles comprises jointly ranking member profiles within the first plurality of member profiles and the second plurality of member profiles and ranking across the first plurality of member profiles and the second plurality of member profiles.

14. The system of claim 13, comprising using the hierarchical machine learning model to capture properties of the first plurality of member profiles during the ranking of the first and second plurality of member profiles and using the captured properties during the ranking.

15. The system of claim 10, wherein causing display of one or more references to one or more member profiles in the first cohort of member profiles comprises:

generating a user interface that includes the one or more references to the selected one or more member profiles presented as a group.

16. The system of claim 15, wherein the user interface includes selection controls to permit a user to select of the one or more references and request an action with respect to a group of member profiles corresponding with the selected references.

17. The system of claim 16, wherein the action is to initiate a connection invitation from the first member with respect to member profiles corresponding to the respective selected references.

18. A machine-readable non-transitory storage medium having instruction data executable by a machine to cause the machine to perform operations comprising:

in an online connection system, detecting a request for recommendations with respect to a first member represented by a first member profile, the request received from a client application executing at a client system associated with the first member;

from the client application, receiving information indicating a viewing context associated with the detected request, the viewing context indicating a first attribute value of a member with whom the first member has recently established a connection via the online connection system;

at a server system, fetching a first plurality of candidate member profiles for providing to the first member as connection recommendations, each candidate member profile in the first plurality of candidate member profiles having a member profile indicating the first attribute value;

ranking the first plurality of candidate member profiles using a machine learning model;

selecting a first cohort of member profiles from the first plurality of candidate member profiles based on the ranking; and causing display of one or more references to one or more member profiles in the first cohort of member profiles on a display device associated with the first member.

* * * * *

UNITED STATES PATENT AND TRADEMARK OFFICE
CERTIFICATE OF CORRECTION

PATENT NO. : 11,113,349 B2
APPLICATION NO. : 16/279779
DATED : September 7, 2021
INVENTOR(S) : Seetharaman et al.

Page 1 of 1

It is certified that error appears in the above-identified patent and that said Letters Patent is hereby corrected as shown below:

In the Claims

In Column 11, Line 53, in Claim 1, after "first", delete "cohort"

In Column 11, Line 60, in Claim 1, after "of", delete "a reference"

In Column 11, Line 65, in Claim 2, delete "a a" and insert --a-- therefor

In Column 12, Line 50, in Claim 10, before "non-transitory", insert --a--

In Column 12, Line 51, in Claim 10, delete "where" and insert --when-- therefor

In Column 12, Line 54, in Claim 10, after "system", insert --,--

In Column 13, Line 4, in Claim 10, after "candidate", delete "entities"

In Column 13, Line 13, in Claim 11, delete "a a" and insert --a-- therefor

In Column 13, Line 21, in Claim 12, after "value", insert --;--

In Column 14, Line 2, in Claim 15, after "the", delete "selected"

In Column 14, Line 2, in Claim 15, after "profiles", insert --,--

In Column 14, Line 5, in Claim 16, after "select", insert --multiple--

Signed and Sealed this
Seventh Day of December, 2021

Drew Hirshfeld
*Performing the Functions and Duties of the*
*Under Secretary of Commerce for Intellectual Property and*
*Director of the United States Patent and Trademark Office*